Nov. 27, 1951     B. B. GAULD     2,576,395
RECORDING AND INDICATING SYSTEM
Filed Oct. 28, 1948
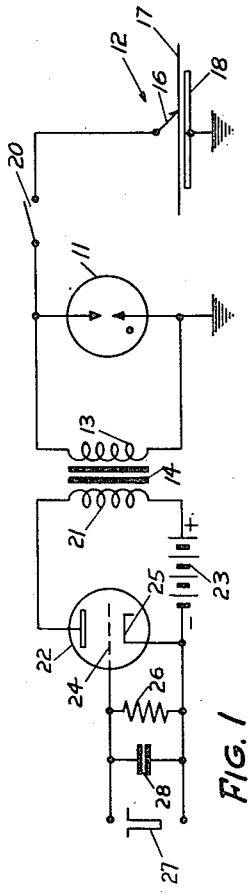
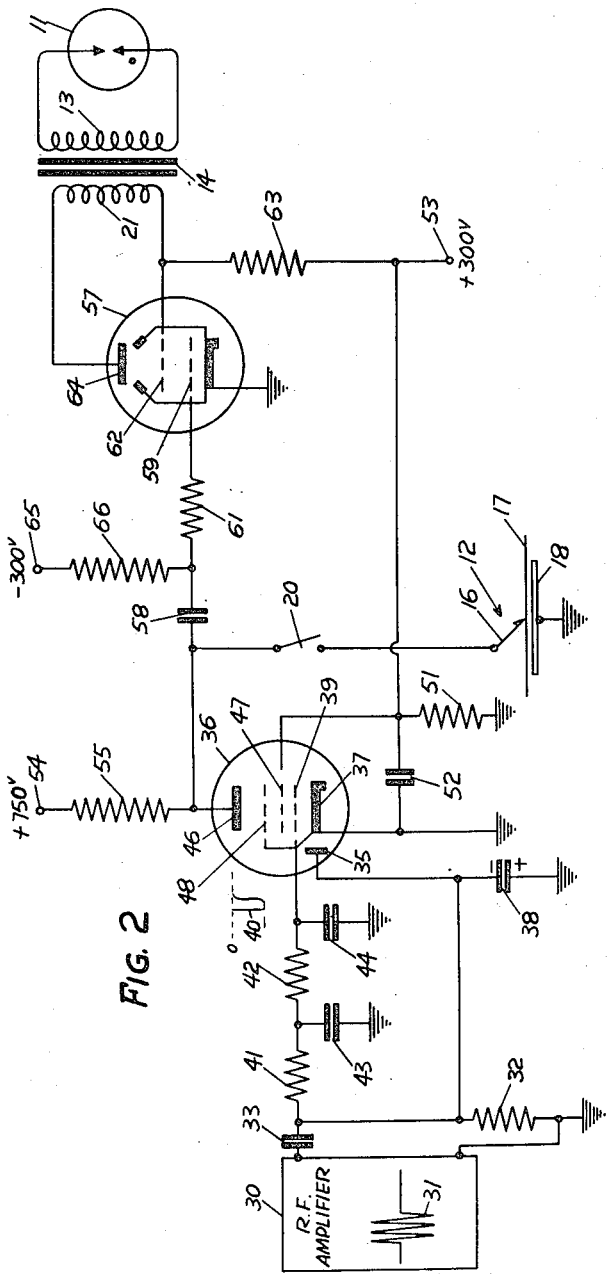
INVENTOR
BROWNLEE B. GAULD
BY
ATTORNEY Patented Nov. 27, 1951

2,576,395

UNITED STATES PATENT OFFICE 2,576,395

RECORDING AND INDICATING SYSTEM

Brownlee B. Gauld, Brookline, Mass., assignor to Raytheon Manufacturing Company, a corporation of Delaware Application October 28, 1948, Serial No. 57,020

8 Claims. (Cl. 346—33)

This invention relates to echo sounding and ranging systems, and more particularly to systems which have a flashing light indicator or the like and a chart and stylus recorder associated with the receiver.

It is an object of this invention to provide an improved receiver circuit from which both an indicator and a recorder can be selectively operated.

It is another object to provide such a circuit wherein the operation of the recorder automatically renders the indicator inoperative, and cessation of operation of the recorder automatically brings the indicator into operation.

It is still another object to provide a circuit having the foregoing features wherein no circuit changes need be made within the receiving circuit itself to effect the change in operation, but rather the mere deenergization of the recorder stylus is all that is required.

The foregoing and other objects and features of the invention will become apparent from the description of certain embodiments thereof that follows, reference being had to the accompanying drawing wherein:

Fig. 1 illustrates one embodiment of the invention, in schematic form; and

Fig. 2 illustrates another embodiment in schematic form.

In the operation of echo depth sounding equipment having both a chart and stylus recorder and an indicator, it is often desirable to employ the indicator alone, there being perhaps no need or desire for a permanent record, in which case the paper supply is conserved by stopping its travel with relation to the stylus. It is then desirable to separate the stylus from the paper to prevent the paper from being cut through by repeated traverses of the stylus over the same portion of the paper. The present invention is eminently suitable for use with such sounding equipment. Mechanism whereby the paper and stylus are separated from each other forms no part of the present invention, however, and is therefore symbolically represented by a switch in the stylus signal circuit in the accompanying drawing.

Referring now to Fig. 1, an indicator 11 and a recorder 12 are shown arranged to be connected in parallel across the secondary winding 13 of an output transformer 14. The indicator 11 is a gaseous glow discharge tube, for example a neon tube, which may require a voltage of 1000 volts or more to cause a discharge therethrough. The recorder 12 comprises, in series connection, a stylus 16, a layer of recording paper 17 of the kind which breaks down when a given voltage is impressed thereacross and is marked by the burning away of a surface layer when current flows, and an electrically conductive platen 18 whereon the paper 17 rests. The platen is grounded, as is one end of the secondary winding 13 and one electrode of the indicator tube 11. The operating voltage of the recorder may be of the order of 300 volts. A single-pole single-throw switch 20 is in series with the stylus 16 and the ungrounded end of the secondary winding 13.

The primary winding 21 of the output transformer 14 is connected in the anode-cathode circuit of an electron tube 22, in series with a source of anode voltage and primary current, represented by a battery 23. The control grid 24 of the tube is connected to the cathode 25 through a resistor 26, and the cathode is connected directly to the negative terminal of the source 23, so that, in the absence of signals on the grid, the tube is normally conductive and current flows at a steady rate through the primary winding 21. The tube is adapted to be cut off upon a signal pulse 27 of a predetermined magnitude being applied between the grid and cathode in a fashion to drive the grid negative with respect to the cathode. A condenser 28 connected in parallel with the resistor 26 is charged by the signal pulse. The charge is dissipated through the resistor in a time determined by the constants of these elements. The tube 22 is the last stage of a receiving circuit described in detail in Patent No. 2,033,160, issued March 10, 1936. As is explained in said patent, when the tube is cut off by a received signal, the cessation of current flow in the primary winding 21 causes a voltage to appear in the secondary winding 13, which voltage is applied to the indicator 11 and recorder 12.

The impedance before discharge of the indicator tube 11 is greater than that of the recorder 12. The transformer 14 is a voltage source of the kind that is poorly regulated; that is, the voltage thereof drops appreciably when current is drawn therefrom. Thus, when the switch 20 is closed and the recorder 12 is operated, the voltage across the indicator 11 is reduced. In the circuit of Fig. 1, the open-circuit voltage provided by the secondary winding 13 is high enough to fire the indicator 11, but the drop in voltage when the recorder is operated is great enough to reduce the voltage left across the indicator below the firing value. With this arrangement, closing the switch 20 causes the recorder to become operative and the indicator inoperative, whereas opening the switch 20 causes the recorder to become inoperative and the indicator operative. The receiver circuit remains physically unaltered at all times; switching from one type of presentation to the other is accomplished solely by the switch 20. It will be appreciated that the function of the switch 20 can be accomplished by physically separating or bringing together the stylus 16 and paper 17, as by lifting the stylus from the paper.

The circuit of Fig. 1 is not particularly adapted to provide signals to the recorder 12 which vary in strength according to the strength of the received signal, but rather provides output signals of approximately the same voltage for all received signal strengths to which it responds. Recorder papers are available, however, which have a dynamic range of about eight decibels; that is, voltages within such a range will make marks of distinguishable density on the paper. The circuit shown in Fig. 2 is designed to take advantage of this property of recording paper.

In Fig. 2, a radio frequency amplifier 30 to which are brought received signals in the form of a burst or pulse 31 of wave energy applies the amplified pulse across a resistor 32 through a coupling capacitor 33. The pulse is then detected via the diode-anode 35 of a diode-pentode tube 36, which may be a type 6SF7. The cathode 37 of this tube is directly connected to ground, while the diode-anode 35 is grounded through a filter capacitor 38, and the resistor 32 in parallel. Conduction around the circuit, including resistor 32, diode-anode 35, cathode 37, and ground during half cycles of the radio frequency when the anode 35 is positive with respect to the cathode 37, places a negative charge on the diode-anode side of the filter capacitor 38. This negative charge is in the form of a negative pulse 40 of unidirectional current, substantially following the shape of the envelope of the amplified pulse 31, and is applied to the control grid 39 of the pentode section of tube 36 through a low-pass filter consisting of two resistors 41 and 42 in series, and two capacitors 43 and 44 connected, respectively, from the junction of these two resistors to ground and from the control grid 39 to ground.

The pentode section of tube 36 includes the cathode 37, control grid 39, and an anode 46, screen grid 47, and suppressor grid 48. The suppressor 48 is directly connected to the cathode. The screen 47 is grounded through a resistor 51 and coupled directly to the cathode through a filter capacitor 52, and is furnished with a screen potential which should be about 300 volts positive through a first high voltage terminal 53. The anode 46 is furnished with anode potential which should be about 750 volts positive at a second high voltage terminal 54 through a load resistor 55, of about 50,000 ohms. In the absence of signals on the control grid 39, the pentode section is conductive and passes about twelve milliamperes. There is thus a voltage drop of about 600 volts in the load resistor 55 and the anode 46 is at a potential of about 150 volts at such times.

The recorder 12 is connected via its switch 20 between the anode 46 and ground. The paper 17 commonly used in underwater sound recorders requires as much as 300 volts between the stylus 16 and platen 18 to mark it. The impedance of the paper just at or before breakdown varies from as high as 60,000 ohms for light markings due to weak signals to about 30,000 ohms for dark markings due to strong signals, the impedance being some function of the current being passed. The negative pulse 40 has a magnitude which depends on the strength of the received signal, so that the current flow in the load resistor 55 and hence the voltage applied between the stylus 16 and platen 18 are functions of the received signal strength. This voltage can vary between 100 volts for no signal at all and 750 volts for maximum signals. The range of output voltages of the tube 36 is thus wide enough to accommodate the full dynamic range of the recording paper. This voltage is unidirectional, and this form of marking is called "D. C." marking.

Received signals are applied to the indicator 11 through a beam power tetrode tube 57, which may be a type 6V6. A coupling capacitor 58 is connected at one side to the pentode-anode 46 of the diode-pentode 36 and at the other side to the control grid 59 of the tetrode 57 through a current limiting resistor 61. The screen grid 62 of the tetrode is connected to the first high voltage terminal 53 through a resistor 63, and the primary winding 21 of the indicator transformer 14 is connected between the screen grid and the anode 64 of this tube. A highly negative bias, for example about 300 volts negative, is applied to the control grid 59 via a third high voltage terminal 65 and a resistor 66, which is connected at one end to the junction of the coupling capacitor 58 and current limiting resistor 61.

The tetrode tube 57 is normally cut off by the 300 volts negative bias on its grid. Removal of this bias renders the tube instantly conductive, for there is no other bias. When the tube becomes conductive, current begins to flow in the primary winding 21 of the transformer 14, inducing a voltage in the secondary winding 13 thereof. A signal voltage which is 300 volts positive can fire the tetrode, which is a voltage that can also operate the recorder. However, when the switch 20 is closed, the recorder is connected in parallel with the pentode section of the diode-pentode tube 36, and when the stylus is fired it lowers the total impedance between the pentode-anode 46 and ground to a point so low that at no time can the negative bias on the grid 59 of the tetrode 57 be overcome. When the switch 20 is opened, signals 40 can cause a sufficient rise in the potential of the anode 46 to overcome the bias on the grid 59 of the tetrode 57, and the tetrode becomes conductive to fire the indicator 11. Tubes of the kind used in the indicator 11 may require as much as 1000 volts to fire them; in fact 1500 volts is desirable. To this end the transformer 14 is conveniently a step-up transformer.

It will be recalled that in the embodiment of Fig. 1 the imperfect regulation of the transformer 14 was employed to prevent the firing of the indicator when the recorder is in use. In Fig. 2, it may be said that again imperfect regulation is employed. This time the source is the 750 volts connected from the second high voltage terminal 54 to ground, the load resistor 55 in series with the pentode section of tube 46 and the recorder 12 in parallel being a voltage divider. The voltage from the anode 46 to ground is so poorly regulated that the low impedance of the recorder 12 causes it to drop too low to cause firing of the indicator 11. It should also be noted that the two devices, indicator and recorder, have their inputs connected in parallel across the poorly regulated voltage source in each figure.

Many other modifications and equivalents of the invention will occur to those skilled in the art. It is accordingly intended that the claims that follow shall not be limited by the details of the embodiments described herein, but only by the prior art.

What is claimed is:

1. In a signaling system, a signal receiver having an output circuit with poor output voltage regulation and providing output signals the voltage of which varies widely in the same sense as changes in the input impedance of a load connected thereacross, a discharge indicator having a relatively high input impedance, a recorder of the stylus-on-paper type, having a relatively low input impedance, means connecting the inputs of said indicator and recorder in parallel across said output circuit, and means for interrupting the current path of said recorder, said discharge indicator being substantially inoperative by said voltage having the magnitude which exists when said path is intact and being operative by said voltage having the magnitude which exists when said path is interrupted.

2. In a signaling system, a signal receiver having a transformer in the output circuit thereof, means providing a substantially constant flow of current in the primary winding of said transformer in the absence of received signals, means to reduce said flow responsive to received signals thereby providing an output signal voltage, a first output information presentation device having a relatively high input impedance, a second output information presentation device having a relatively low input impedance, means connecting the inputs of said devices in parallel across the secondary winding of said transformer, said relatively low input impedance being of a magnitude which drops the output voltage at said secondary winding below a value required to operate said first device when signals are received, and means to interrupt the path through said second device.

3. In a signaling system, a signal receiver having an electron tube with an anode, cathode and control grid, a source of anode potential, an impedance element connected between said source and said anode, means biasing said tube to conduct current in the absence of received signals, means operative upon said control grid to reduce the flow of said current in proportion to the strength of received signals, a first output information presentation device having a relatively high input impedance, a second output information presentation device having a relatively low input impedance, means connecting the inputs of said devices in parallel across the anode-cathode path of said tube, said relatively low input impedance being of a magnitude which drops the voltage across said anode-cathode path below a value required to operate said first device when signals are received, and means to interrupt the path through said second device.

4. In a signaling system, a signal receiver having a transformer in the output circuit thereof, means providing a substantially constant flow of current in the primary winding of said transformer in the absence of received signals, means substantially to cut off said flow responsive to received signals thereby providing an output signal voltage, a first output information presentation device having a relatively high input impedance, a second output information presentation device having a relatively low input impedance, means connecting the inputs of said devices in parallel across the secondary winding of said transformer, said relatively low input impedance being of a magnitude which drops the output voltage at said secondary winding below a value required to operate said first device when signals are received, and means to interrupt the path through said second device.

5. In a signaling system, a signal receiver having a transformer in the output circuit thereof, means providing a substantially constant flow of current in the primary winding of said transformer in the absence of received signals, means to reduce said flow responsive to received signals thereby providing an output signal voltage, a gaseous discharge device indicator, a stylus-on-paper recorder, means to connect both said indicator and said recorder in parallel across the secondary winding of said transformer, and means to interrupt the current path through said recorder, said discharge indicator being substantially inoperative by said voltage having the magnitude which exists when said path is intact and being operative by said voltage having the magnitude which exists when said path is interrupted.

6. In a signaling system, a signal receiver having an electron tube with an anode, cathode, and control grid, a source of anode potential, an impedance element connected between said source and said anode, means biasing said tube to conduct current in the absence of received signals, means operative upon said control grid to reduce the flow of said current in proportion to the strength of received signals thereby providing an output signal voltage, a recorder of the stylus-on-paper type, a gaseous discharge device indicator having input means providing higher input impedance than that of said recorder, means connecting said recorder and said input means in parallel across said tube, and means to interrupt the current path through said recorder, said discharge indicator being substantially inoperative by said voltage having the magnitude which exists when said path is intact and being operative by said voltage having the magnitude which exists when said path is interrupted.

7. In combination, an electrical signal translation circuit having an output circuit with poor output voltage regulation and providing output signals the voltage of which varies widely in the same sense as changes in the input impedance of a load connected thereacross, an output signal utilization device connected across said output circuit, means providing an electric current path of substantially lower impedance than that through said device connected in parallel with said device, and switch means in said path arranged to interrupt said path, said device being substantially inoperative by said voltage having the magnitude which exists when said path is intact and being operative by said voltage having the magnitude which exists when said path is interrupted.

8. A source of voltage signals, said source having poor voltage regulation and providing signals the voltage of which varies widely in the same sense as changes in the input impedance of a load connected thereacross, a first signal utilization device having relatively high input impedance, a second signal utilization device having relatively low input impedance, means connecting the inputs of both said devices in parallel across said source, and means to interrupt the path through said second device, said first device being substantially inoperative by said voltage having the magnitude which exists when said path is intact and being operative by said voltage having the magnitude which exists when said path is interrupted.

BROWNLEE B. GAULD.

REFERENCES CITED

The following references are of record in the file of this patent:

UNITED STATES PATENTS

| Number | Name | Date |
| --- | --- | --- |
| 1,748,797 | Russell | Feb. 25, 1930 |
| 2,402,391 | Goddard | June 18, 1946 |
| 2,412,234 | Turner, Jr. | Dec. 10, 1946 |
| 2,443,647 | Waterman | June 22, 1948 |
| 2,457,131 | Curtis | Dec. 28, 1948 |